US006327939B1

(12) United States Patent
Macor

(10) Patent No.: US 6,327,939 B1
(45) Date of Patent: Dec. 11, 2001

(54) WRENCH ORIFICE WITH LATERAL GRIPPING GROOVES

(75) Inventor: Richard J. Macor, Hunterdon County, NJ (US)

(73) Assignee: Proprietary Technologies, Inc.

( * ) Notice: Subject to any disclaimer, the term of this patent is extended or adjusted under 35 U.S.C. 154(b) by 0 days.

(21) Appl. No.: 09/716,048

(22) Filed: Nov. 20, 2000

(51) Int. Cl.[7] .................................................... B23B 13/02
(52) U.S. Cl. ............................................ 81/125; 81/121.1
(58) Field of Search .................................. 81/121.1, 125, 81/124.3, 124.4, 125.1, 119

(56) References Cited

U.S. PATENT DOCUMENTS 2,834,240 * 5/1958 Schlichting ............................ 81/125
3,253,626 * 5/1966 Stillwagon, Jr. et al. ............. 81/125
4,644,831 * 2/1987 Yang ..................................... 81/125
5,724,872 * 3/1998 Shih ...................................... 81/125

* cited by examiner

*Primary Examiner*—Joseph J. Hail, III
*Assistant Examiner*—Joni B. Danganan

(57) ABSTRACT

A wrench tool is described for turning fasteners. The wrench tool comprises an orifice and means to reduce tilting of a fastener therein while being torqued. The orifice is substantially cylindrical and has a predetermined maximum circumference at a driving end thereof. The orifice further comprises an array of longitudinal engaging surfaces positioned therein around an imaginary central axis. The means to reduce tilting comprises at least one groove formed at least partially within at least one of the longitudinal engaging surfaces. Each groove is formed laterally relative to the imaginary central axis and has a depth which does not penetrate outwardly beyond the maximum circumference of the orifice. And, each groove is positioned at least slightly away from the driving end of the orifice.

20 Claims, 2 Drawing Sheets

WRENCH ORIFICE WITH LATERAL GRIPPING GROOVES

FIELD OF THE INVENTION

The present invention relates to hand tools, particularly wrenches which have an orifice for turning fasteners, including sockets and box wrenches.

BACKGROUND OF THE INVENTION

In the past, there have been many attempts, some successful, to improve the lateral turning interaction between a wrench and fastener. These attempts have focused upon increased surface-to-surface engagement between wrench and fastener and/or improved lateral friction between wrench and fastener to preclude fastener slippage within a turning wrench.

Although there have been attempts to increase the lateral friction between a wrench and fastener, there has been little or no attempt to increase the longitudinal friction between a wrench and fastener to reduce the effects of "tilt-off" and/or "taper-off" between a turning wrench and fastener as defined herein.

Applicant defines the "tilt-off" effect as an effect which occurs when a user is turning a fastener (either tightening or loosening) and the wrench becomes slightly tilted on the fastener. When this occurs, the forces involved tend to push the wrench orifice away from and off the fastener often damaging the fastener and/or wrench, and possibly injuring the user. Applicant defines the "taper-off" effect as an effect which occurs when a user is turning a fastener (either tightening or loosening) which is slightly eroded, rusted, and/or manufactured with a slight tapered or conical head. When this occurs, the forces involved also tend to push the wrench away from and off the fastener often damaging the fastener and/or wrench, and possibly injuring the user.

Applicant believes that the "tilt-off" and "taper-off" effects defined herein occur easily and frequently because it is difficult for a user to maintain a continuous, properly seated relationship between a wrench and fastener when both are being forcibly turned. Additionally, it is common to encounter a fastener which is slightly eroded, rusted, and/or manufactured such that the head of the fastener is slightly tapered or conical.

SUMMARY OF THE INVENTION

The present invention involves a wrench tool or tool attachment which has an orifice for controlling the rotation of a fastener.

The present invention more specifically involves a wrench tool which has an orifice for turning fasteners. The orifice is substantially cylindrical and has a predetermined maximum circumference and a driving end for engaging with various fasteners. The orifice comprises an array of longitudinal, fastener engaging surfaces positioned therein around an imaginary central axis. At least one of the longitudinal, engaging surfaces has at least one groove formed at least partially therein. Each groove is formed laterally, relative to the imaginary central axis and has a depth that does not penetrate outwardly beyond the maximum circumference of the orifice, and, each groove is positioned at least slightly away from the driving end of the orifice.

Each groove promotes longitudinal friction between wrench and fastener thereby reducing the "tilt-off" and/or "taper-off" effects defined herein. Importantly, this longitudinal friction technology may be used in conjunction with known lateral friction technologies to provide for a wrench tool with superior lateral and longitudinal gripping performance under torque.

Accordingly, it is an important objective of the present invention described above to increase the longitudinal friction between a turning wrench and a fastener thereby preventing or significantly reducing the effects of "tilt-off" and/ or "taper-off" between wrench and fastener as defined herein.

It is another objective of the present invention to reduce wrench wear and breakage.

It is yet another objective of the present invention to reduce the potential of injury to a user.

It is yet another objective of the present invention that it be compatible with other known lateral friction technologies so as to provide for a wrench tool with superior lateral and longitudinal gripping performance under torque.

And, it is yet another objective of the present invention that it be commercially viable, simple in design, and cost efficient to manufacture.

DETAILED DESCRIPTION OF THE DRAWINGS

Figure 1:
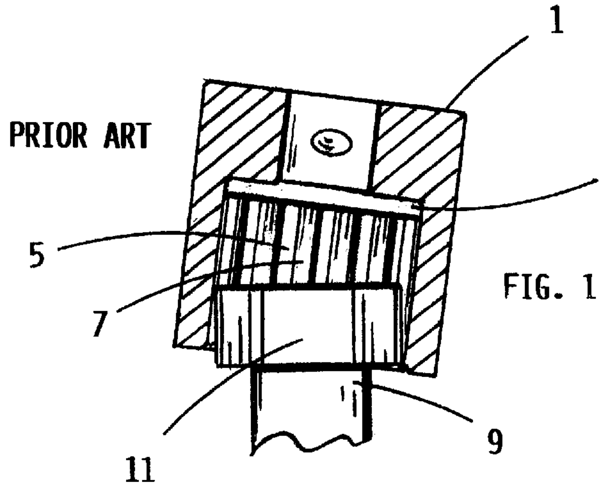
FIG. 1 shows a side view of a prior art socket and cut section of a bolt, showing a "tilt off" situation occurring between socket and bolt during the application of torque; and, FIG. 2 shows a side, cross-section view of the present invention wrench tool being a socket; and, FIG. 3 shows a top view of the present invention socket shown in FIG. 2; and, FIG. 4 shows a side, cross-section view of the present invention wrench tool being a box type wrench; and, FIG. 5 shows a top view of the present invention box wrench shown in FIG. 4.

Referring now to the drawings which are for the purpose of illustrating preferred embodiments of the present invention and not for the purpose of limiting same, FIG. 1 shows a side, cross-section view of a prior art socket and cut section of a bolt. There is shown wrench socket 1 having an orifice 3 with longitudinal, engaging surfaces positioned therein represented by 5 and 7. Socket 1 is a standard type socket which in this case has 24 longitudinal, engaging surfaces, half of which are seen in this side, cross-section view. Prior art socket 1 is applying torque to bolt head 11 of bolt 9, and a tilt-off effect is occurring. Frequently, it is difficult for a user to maintain a continuous, properly seated relationship between a wrench and fastener when both are being forcibly turned. Additionally, it is common to encounter a fastener which is slightly eroded, rusted, and/or manufactured such that the head of the fastener is slightly tapered or conical. Consequently, a user will experience a tilt-off and/or taper-off effect. As defined earlier herein, applicant defines the "tilt-off" effect as an effect which occurs when a user is turning the fastener (either tightening or loosening) and the wrench head becomes slightly tilted on the fastener. When this occurs, the forces involved tend to push the wrench orifice away from and off the fastener often damaging the fastener and/or wrench, and possibly injuring the user. Also, applicant earlier defines the "taper-off" effect as an effect which occurs when a user is turning a fastener (either tightening or loosening) which is slightly eroded, rusted and/or manufactured with a slight tapered or conical head. When this occurs, the forces involved tend to push the wrench away from and off the fastener often damaging the fastener and/or wrench, and possibly injuring the user. Embodiments of the present invention shown in FIGS. 2 through 5 specifically address and reduce both the tilt-off and taper-off effects.

Figure 2:
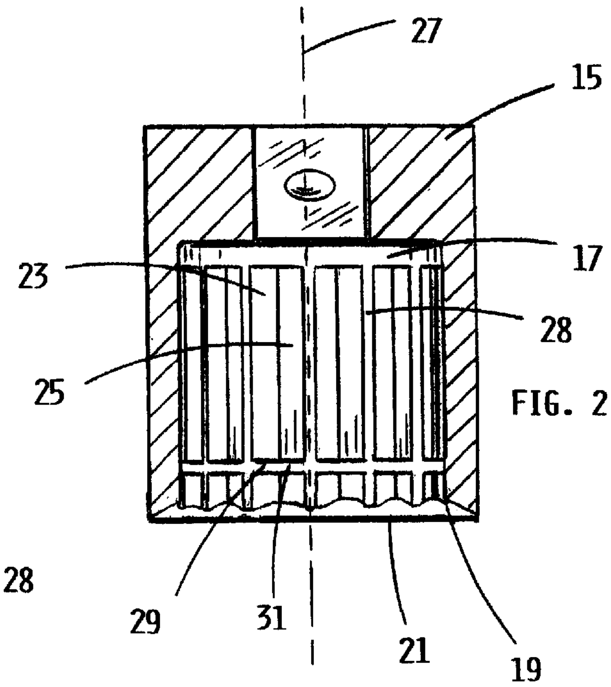
Figure 3:
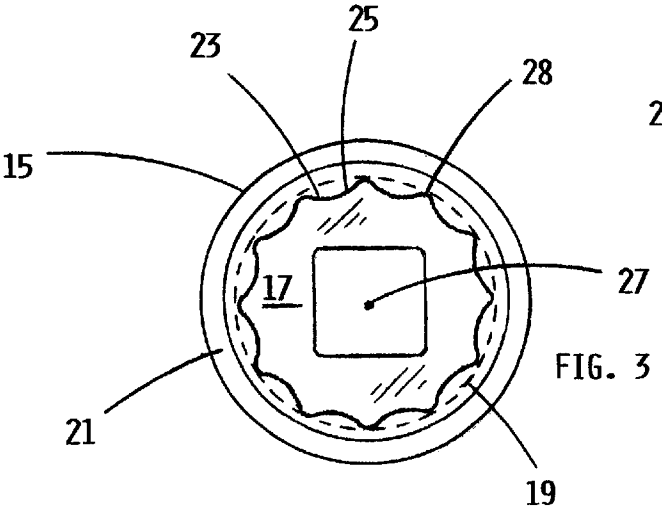

Referring now to FIGS. 2 and 3, FIG. 2 shows a side, cross-section view of a present invention wrench tool being a socket; and, FIG. 3 shows a top view of the same socket shown in FIG. 2. There is shown a present invention wrench tool 15 which in this embodiment is a standard, wrench socket which has an orifice 17 for turning fasteners. Orifice 17 is substantially cylindrical and has a predetermined maximum circumference 19 at driving end 21 for engaging with various fasteners. Orifice 17 comprises an array of longitudinal, fastener engaging surfaces positioned therein around an imaginary central axis 27. Two of the twenty four longitudinal, engaging surfaces of this embodiment are represented by engaging surfaces 23 and 25. All twenty four engaging surfaces are not numbered so as not to crowd the drawing and confuse the comprehension thereof. Accordingly, half of the twenty four longitudinal, engaging surfaces of this standard socket 15 can be seen in FIG. 2; and, the ends of all twenty four longitudinal, engaging surfaces can be seen in FIG. 3. Most wrenches have an orifice with longitudinal, engaging surfaces. The number may be as few as three, or as many as twenty four, or more. Usually, a wrench orifice designed to turn a hexagonal fastener will have between six and twenty four, or possibly more longitudinal engaging surfaces. In these FIGS. 2 and 3, all of the longitudinal engaging surfaces each have at least one groove formed at least partially therein. This is shown and represented by engaging surface 23 having groove 29, and, engaging surface 25 having groove 31 as shown in FIG. 2. Preferred embodiments of the present invention require that at least one of the longitudinal, engaging surfaces within the orifice have at least one groove formed partially therein. A preferred embodiment of the present invention includes at least six longitudinal, engaging surfaces, of which four or more, each have at least one groove formed at least partially therein. Another preferred embodiment of the present invention includes at least twenty four longitudinal, engaging surfaces of which at least eight or more, each have at least one of said grooves formed therein. And, another preferred embodiment of the present invention includes at least twenty four internal engaging surfaces, all of which have at least one groove formed at least partially therein.

In all cases, it is important that each groove is formed laterally, relative to the imaginary central axis to maximize the longitudinal friction between wrench and fastener. The lateral or "side to side" formation of a groove tends to preclude and/or minimize the effects of tilt-off and/or taper-off as defined herein. It is clear to see that grooves 29 and 31 are formed laterally, relative to the imaginary central axis 27. Grooves 29 and 31 are also formed laterally, relative to longitudinal engaging surfaces 23 and 25 respectively, which are substantially parallel to imaginary central axis 27.

Also, in all cases, a groove of the present invention must not penetrate outwardly beyond the maximum circumference of the orifice, so as to maintain the maximum bursting strength of the wrench tool. This is more easily understood when viewing FIG. 3. Orifice 17 has a predetermined, maximum circumference 19, generally defined by the twelve pointed areas of orifice 17, one of which is represented by 28. The twelve pointed areas of orifice 17 are created by the twenty four, longitudinal engaging surfaces represented by 23 and 25. The twelve points of orifice 17 represent the weakest areas of socket 15 because the walls of socket 15 are most thin in these areas. Accordingly, the bursting strength of a wrench tool 15 will be compromised if a groove were to penetrate outwardly beyond the maximum circumference 19 of the orifice 17. Therefore, the present invention includes groove(s) which do not reduce the minimum thickness of the tool structure surrounding the orifice thereby maintaining the inherent strength of the wrench tool.

Also, in all cases, the present invention will have groove (s) spaced at least slightly away from the end of the orifice to maximize the longitudinal friction imparted to a fastener during the application of torque. This can be seen in FIG. 2 with grooves 29 and 31 are each positioned slightly away from the engaging end 21 of orifice 17.

Figure 5:
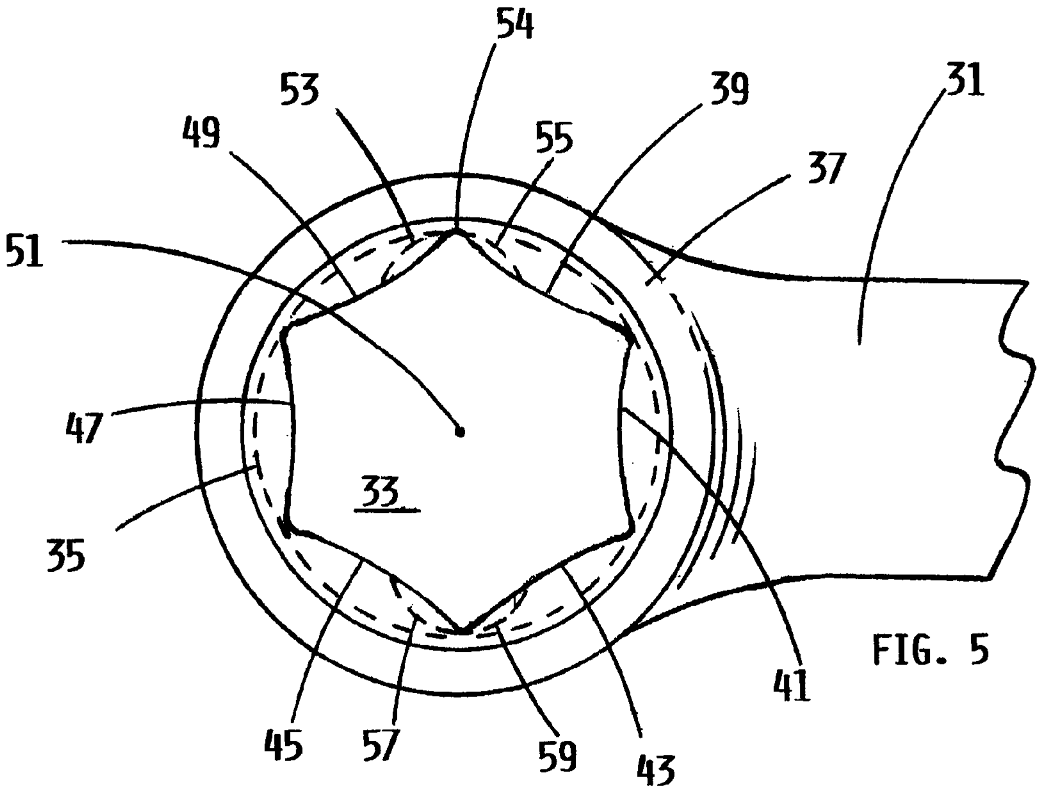
Figure 4:
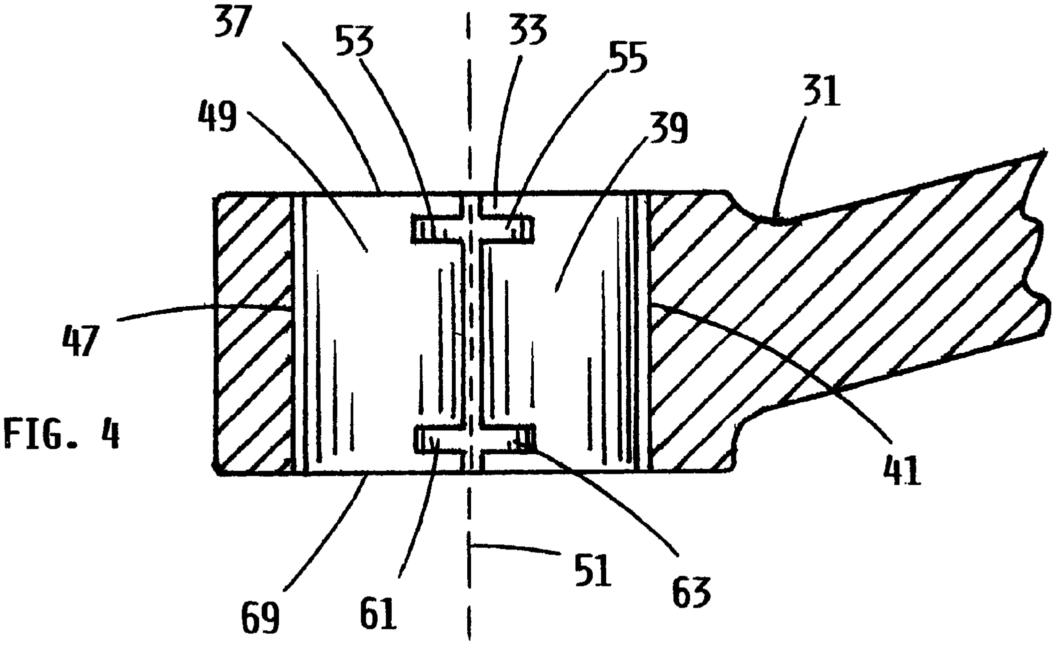

Referring now to FIGS. 4 and 5, FIG. 4 shows a side, cross-section view of a present invention wrench tool which is a box wrench; and, FIG. 5 shows a top view of the same box wrench shown in FIG. 4. There is shown a present invention box wrench 31 which has an orifice 33 for turning fasteners. Orifice 33 is substantially cylindrical and has a predetermined maximum circumference 35 (seen best in FIG. 5) at driving end 37 for engaging with various fasteners. In FIG. 4, another driving end 69 is also visible. Note that this embodiment actually has two driving ends for engaging with various fasteners, unlike the socket shown in previous views. The present invention requires that there be an orifice with at least one driving end, for example a socket. However, there could also be more than one driving end for example, a box type or flat wrench which typically has two driving ends. Orifice 33 comprises an array of longitudinal, fastener engaging surfaces positioned therein around imaginary central axis 51. There are six, longitudinal engaging surfaces 39, 41, 43, 45, 47 and 49. Most wrenches have an orifice with longitudinal, engaging surfaces. The number may be as few as three, or as many as twenty four, or more. Usually, a wrench orifice designed to turn a hexagonal fastener will have between six and twenty four, or possibly more longitudinal, engaging surfaces. In these FIGS. 4 and 5, four of the six longitudinal, engaging surfaces each have at least one groove formed at least partially therein. Preferred embodiments of the present invention require that at least one of the longitudinal engaging surfaces within the orifice have at least one groove formed partially therein. The preferred embodiment shown here in FIGS. 4 and 5 include six internal engaging surfaces, of which four or more each have at least one groove formed at least partially therein. In FIG. 5, the grooves are not readily seen but are represented by semi-circular dotted lines 53, 55, 57 and 59. Engaging surface 43 has a groove 59; and, engaging surface 45 has groove 57; and, engaging surface 49 has groove 53 and engaging surface 39 has groove 55. Grooves 53 and 55 can be seen clearly in FIG. 4. In FIG. 5, it can be seen that the grooves are positioned in a pattern around imaginary central axis 51, and the pattern is symmetrical. The symmetrical positioning of the grooves around the imaginary central axis provides for a symmetrical engagement of wrench orifice to fastener thereby enhancing the affects of the longitudinal friction achieved between wrench and fastener. In FIG. 4, grooves 53 and 61 can be seen formed in longitudinal engaging surfaces 49; and, grooves 55 and 63 can be seen formed in longitudinal engaging surface 39. Longitudinal engaging surfaces 49 and 39 have then, therefore, two grooves formed in each. This is because orifice 33 has two ends for engaging with fasteners which is typical of a box and/or flat wrench. Engaging surfaces 43 and 45 also have two grooves each similar to those formed in engaging surfaces 49 and 39 but are not readily seen in FIG. 4.

In all cases, it is important that each groove is formed laterally, relative to the imaginary central axis to maximize the longitudinal friction between wrench and fastener. The lateral or "side to side" formation of a groove tends to preclude and/or minimize the effects of tilt-off and/or taper-off as defined herein. In FIG. 4, it is clear to see that grooves 53, 55, 61 and 63 are each formed laterally, relative to the imaginary central axis 51. Grooves 53, 55, 61 and 63 are also formed laterally, relative to longitudinal engaging surfaces 49 and 39, both of which are substantially parallel to imaginary central axis 51.

Also, in all cases, a groove of the present invention must not penetrate outwardly beyond the maximum circumference of the orifice, so as to maintain the maximum bursting strength of the wrench tool. This is more easily understood when viewing FIG. 5. Orifice 33 has a predetermined, maximum circumference 35, generally defined by the six pointed areas of orifice 33, one of which is represented by 54. The six pointed areas of orifice 33 are created by the six longitudinal, engaging surfaces 39, 41, 43, 45, 47 and 49. These longitudinal, engaging surfaces may include several surfaces of more than one plane, connected together. The six points of orifice 33 represent the weakest areas of box wrench 31 because the walls of box wrench 31 are most thin in these areas. Accordingly, the bursting strength of a wrench tool 31 will be compromised if a groove were to penetrate outwardly beyond the maximum circumference 35 of the orifice 33. Therefore, the present invention includes groove (s) which do not reduce the minimum wall thickness of the tool structure surrounding the orifice thereby maintaining the inherent strength of the wrench tool.

Also, in all cases, the present invention will have groove (s) spaced at least slightly away from the end(s) of the orifice, to maximize the longitudinal friction imparted to a fastener during the application of torque. This can be seen in FIG. 4, wherein grooves 61 and 63 are positioned slightly away from the engaging end 69, and, grooves 53 and 55 are positioned slightly away from the engaging end 37 of orifice 33.

Upon reading and understanding the specification of the present invention described above, modifications and alterations will become apparent to those skilled in the art. It is intended that all such modifications and alterations be included insofar as they come within the scope of the patent as claimed or the equivalence thereof.

Having thus described the invention, the following is claimed:

1. A wrench tool for turning fasteners, said wrench tool comprising an orifice and means to reduce tilting of a fastener therein while being torqued, said orifice being substantially cylindrical and having a predetermined maximum circumference at a driving end thereof, said orifice further comprising an array of longitudinal engaging surfaces positioned therein around an imaginary central axis, said means to reduce tilting comprising at least one groove formed at least partially within at least one of said longitudinal engaging surfaces, each said groove being formed laterally relative to said imaginary central axis and having a depth not penetrating outwardly beyond said maximum circumference of said orifice, and, each said groove further being positioned at least slightly away from said driving end of said orifice.

2. A wrench tool of claim 1, wherein said wrench tool is a socket.

3. A wrench tool of claim 1, wherein said wrench tool is a box type wrench.

4. A wrench tool of claim 1, wherein there are at least six longitudinal engaging surfaces with at least four of said engaging surfaces each having at least one of said grooves formed therein.

5. A wrench tool of claim 4, wherein said grooves are positioned in a pattern around said imaginary central axis, and said pattern is symmetrical.

6. A wrench tool of claim 4, wherein said wrench tool is a socket.

7. A wrench tool of claim 4, wherein said wrench tool is a box type wrench.

8. A wrench tool of claim 1, wherein there are at least twenty four longitudinal engaging surfaces with at least eight of said engaging surfaces each having at least one of said grooves formed therein.

9. A wrench tool of claim 8, wherein said grooves are positioned in a pattern around said imaginary central axis, and said pattern is symmetrical.

10. A wrench tool of claim 1, wherein there are at least twenty four longitudinal engaging surfaces with all of said engaging surfaces each having at least one of said grooves formed therein.

11. A wrench tool for turning fasteners, said wrench tool comprising an orifice and means to reduce tilting of a fastener therein while being torqued, said orifice being substantially cylindrical and having a predetermined maximum circumference at a driving end thereof, said orifice further comprising an array of at least six longitudinal engaging surfaces positioned therein around an imaginary central axis, said means to reduce tilting comprising at least one groove formed at least partially within at least four of said longitudinal engaging surfaces, each said groove being formed laterally relative to said imaginary central axis and having a depth not penetrating outwardly beyond said maximum circumference of said orifice and being positioned at least slightly away from said driving end of said orifice, and, each said groove further being formed substantially narrow and substantially non-angular.

12. A wrench tool of claim 11, wherein said wrench tool is a socket.

13. A wrench tool of claim 11, wherein said wrench tool is a box type wrench.

14. A wrench tool of claim 11, wherein there are at least twenty four longitudinal engaging surfaces with at least eight of said engaging surfaces each having at least one of said grooves formed therein.

15. A wrench tool of claim 14, wherein said grooves are positioned in a pattern around said imaginary central axis, and said pattern is symmetrical.

16. A wrench tool of claim 14, wherein said wrench tool is a socket.

17. A wrench tool of claim 14, where in said wrench tool is a box type.

18. A wrench tool of claim 1, wherein there are at least twenty four longitudinal engaging surfaces with all of said engaging surfaces each having at least one of said grooves formed therein.

19. A wrench tool of claim 18, wherein said wrench tool is a socket.

20. A wrench tool of claim 18, wherein said wrench tool is a box type wrench.

* * * * *